United States Patent
Mendoza (12)

(10) Patent No.: US 6,350,927 B2
(45) Date of Patent: Feb. 26, 2002

(54) THERMAL FLUID BLENDS CONTAINING 1, 2,3,4-TETRAHYDRO (1-PHENYLETHYL) NAPHTHALENE

(75) Inventor: Abel Mendoza, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/769,130

(22) Filed: Jan. 24, 2001

Related U.S. Application Data

(63) Continuation-in-part of application No. 09/402,734, filed as application No. PCT/US98/08568 on Sep. 30, 1998, now Pat. No. 6,239,320.
(60) Provisional application No. 60/046,120, filed on May 9, 1997, and provisional application No. 60/181,888, filed on Feb. 11, 2000.

(51) Int. Cl.[7] .................................................. H01B 3/22
(52) U.S. Cl. ............................ 585/6.3; 585/1; 252/570; 252/73
(58) Field of Search ...................... 585/1, 6.3; 252/570, 252/73

(56) References Cited

U.S. PATENT DOCUMENTS

| 4,011,274 | A |   | 3/1977 | Watanabe et al. |
| 5,017,733 | A |   | 5/1991 | Sato et al. ..................... 585/6.3 |
| 5,081,757 | A | * | 1/1992 | Sato et al. ..................... 585/6.3 |

FOREIGN PATENT DOCUMENTS

| DE | 1419604 | 5/1969 |          |
| EP | 795543  | 9/1997 | ......... C07C/263/04 |

OTHER PUBLICATIONS

Benjamin, Ben M. et al., Thermal cleavage of chemical bonds in selected coal–related structures, Fuel, May 1978, vol. 57, pp. 269–272 No month.

Commandeur, R. et al., A New Family of High Performance Thermal Fluids, Informations Chimie, vol. 33, No. 376, 1996–03, pp. 93–96 (translation) No month.

Galasso, P.J. et al., Syntrel 350 Un nuovo fluido diatermico sintetico per alte prestazioni, Pitture Vernici, 1986, vol. 62, 10, pp. 103–107—English language sections No month Considered Only English Summary.

Matsumoto, Tadashi et al., Thermal Transfer Fluid: 1–Phenyl–1–tetrahydronaphthylethane, Ind. Eng. Chem., Prod. Res. Dev., vol. 15, No. 3, 1976, presented at the Division of Industrial and Engineering Chemistry, Centennial Meeting of the American Chemical Society, New York, N.Y., Apr. 1976, pp. 215–218.

Syntrel 350 heat transfer fluid, Exxon Chemicals, May 1988, pp. 103–107.

JP 05017741A, Nippon Steel Chem. Co., Abstract only, Jan. 1993.

ASTM method D2887—Standard Test method for Boiling Range Distribution of Petroleum Fractions by Gas Chromatography No Date Available.

DIN method 51528—Testing of Mineral Oils and Related Products. Determination of Thermal Stability of Unused Heat Transfer Fluids, 1998 No Month.

* cited by examiner

*Primary Examiner*—Elizabeth D. Wood
(74) *Attorney, Agent, or Firm*—Dale H. Schultz

(57) ABSTRACT

A high temperature heat transfer fluid is disclosed which comprises a mixture of 1,2,3,4-tetrahydro(1-phenylethyl) naphthalene and an alkyl biphenyl to provide high temperature heat transfer fluids exhibiting favorable thermal stability.

9 Claims, 11 Drawing Sheets

US 6,350,927 B2

THERMAL FLUID BLENDS CONTAINING 1, 2,3,4-TETRAHYDRO (1-PHENYLETHYL) NAPHTHALENE

CROSS REFERENCE

This is a continuation-in-part application of U.S. application No. 09/402,734, now U.S. Pat. No. 6,239,320 which issued on May 29, 2001. This application, thereby, claims the benefit of U.S. Provisional Application No. 60/046,120 filed May 9, 1997; derived International Application No. PCT/US98/08568 filed Apr. 30, 1998; and derived U.S. application Ser. No. 09/402,734 filed Oct. 8, 1999, now U.S. Pat. No. 6,239,320 which issued on May 29, 2001 and claims benefit of 60/181,888, filed Feb. 11, 2000.

FIELD OF INVENTION

This invention relates to high temperature thermal (heat transfer) fluids, and more particularly to heat transfer fluids comprising blends of 1,2,3,4 tetrahydro(1-phenyl-ethyl) naphthalene and an alkyl biphenyl.

BACKGROUND

Heat transfer fluids (also denoted as "thermal fluids") are widely used for temperature control in manufacturing facilities. The ability of a heat transfer fluid to resist degradation at elevated temperatures is referenced through a performance property denoted as "thermal stability". As a heat transfer fluid undergoes degradation, both volatile materials (which "boil" or evaporate from the fluid) and "heavy" materials (also denoted as "highers" or "residue") are formed within the heat transfer fluid. Such heavy components elevate the heat transfer fluid's viscosity and thereby lead to an increase in film temperature in the portion of heat transfer fluid denoted as the "film" which exists at the interface of the heat transfer fluid and a high temperature (respective to the temperature of the fluid) surface; any such differential in film temperature above the temperature of the less viscous portion of the heat transfer fluid augments the rate of degradation in the heat transfer fluid as a whole insofar as the film portion intermixes with the remainder of the heat transfer fluid. Further, polymers formed through the degradation of a heat transfer fluid tend to darken the fluid and ultimately deposit on surfaces in the system; these deposits are detrimental to system efficiency and potentially lead to system failure. Significantly, degraded heat transfer fluid must, therefore, be periodically replaced with fresh or recycled heat transfer fluid.

The long-standing importance of finding heat transfer fluids exhibiting improved thermal stability is evidenced, for example, by Matsumoto et al., Ind. Eng. Chem., Prod. Res. Dev., Vol. 15, no. 3, 1976, pp. 215–218, which is herein incorporated by reference. Matsumoto tested the thermal stability of 1-phenyl-1-tetrahydronaphthyl-ethane (PTE, also called 1,2,3,4-tetrahydro(1-phenylethyl)naphthalene which is abbreviated herein as ST-THN) and compared the results with thermal fluids such as dibenzyl benzenes and partially hydrogenated terphenyls which are well-established heat transfer fluids in the industry. Matsumoto's results showed ST-THN to have favorable properties for a high boiling point thermal fluid. Matsumoto also identified the degradation products from ST-THN. Although ST-THN was found to have favorable properties alone, its compatibility with other heat transfer fluids was not investigated.

In industrial applications, the ability to mix different thermal fluids without the detrimental effects described above is advantageous. Therefore, a cost-effective heat transfer fluid blend having favorable thermal stability properties is desirable.

SUMMARY OF INVENTION

This invention is a heat transfer fluid which comprises a mixture of 1,2,3,4-tetrahydro(1-phenylethyl)naphthalene (ST-THN) as a first fluid component and an alkyl biphenyl as the second fluid component. It has been discovered, surprisingly, that mixing ST-THN with specific second fluid components as described herein yields a heat transfer fluid with a thermal stability property significantly improved over the thermal stability of either of the components prior to their blending.

The heat transfer fluid is beneficially admixed from 1,2,3,4-tetrahydro(1-phenylethyl)naphthalene; and a second fluid characterized as an aromatic component having alkyl, cyclohexyl, or cyclopentyl linkages; preferably, alkyl linkages. The second fluid is preferably other than a degradation product of 1,2,3,4-tetrahydro (1-phenylethyl)naphthalene.

More specifically, the heat transfer fluid is admixed from: 1,2,3,4-tetrahydro(1-phenylethyl)naphthalene; and a second fluid selected from the group consisting of dibenzyl toluene, partially hydrogenated terphenyl, dibenzyl benzene, xylyl toluene, dixylyl toluene, xylyl xylene, dixylyl xylene, diethylbenzene, 1,1-diphenylethane, benzene alkylates, alkylnaphthalenes, alkyl biphenyls, diphenylmethane, cyclohexyl-diphenyl ether, alkyldiphenylethers, triphenylmethane, tritolylmethane, and mixtures thereof.

More specifically, the heat transfer fluid is admixed from: 1,2,3,4-tetrahydro(1-phenylethyl)naphthalene as a first fluid component and a second fluid component selected from the group consisting of a partially hydrogenated terphenyl, an alkyl biphenyl, and mixtures thereof; the alkyl biphenyl is selected from the group consisting of 1,1-diphenylethane, methylbiphenyl, ethylbiphenyl, diethylbiphenyl, triethylbiphenyl, propylbiphenyl, dipropylbiphenyl, isopropylbiphenyl, diisopropylbiphenyl, butylbiphenyl, dibutylbiphenyl, and mixtures thereof.

Another embodiment of the present invention is a method for preparing a heat transfer fluid. The method comprises admixing a first fluid component of 1,2,3,4-tetrahydro(1-phenylethyl)naphthalene with a second fluid component as described above. The 1,2,3,4-tetrahydro(1-phenylethyl) naphthalene component preferably constitutes at least 10 percent by weight of the total heat transfer fluid.

A further embodiment of the present invention is a method of controlling the temperature of a system. The method comprises adding to the system a first fluid component of 1,2,3,4-tetrahydro(1-phenylethyl)naphthalene and a second fluid component as described above. The 1,2,3,4-tetrahydro(1-phenylethyl)naphthalene and the second fluid component are, in one embodiment, added to the system separately, or, in another embodiment, admixed together prior to addition to the system.

Figure 1A:
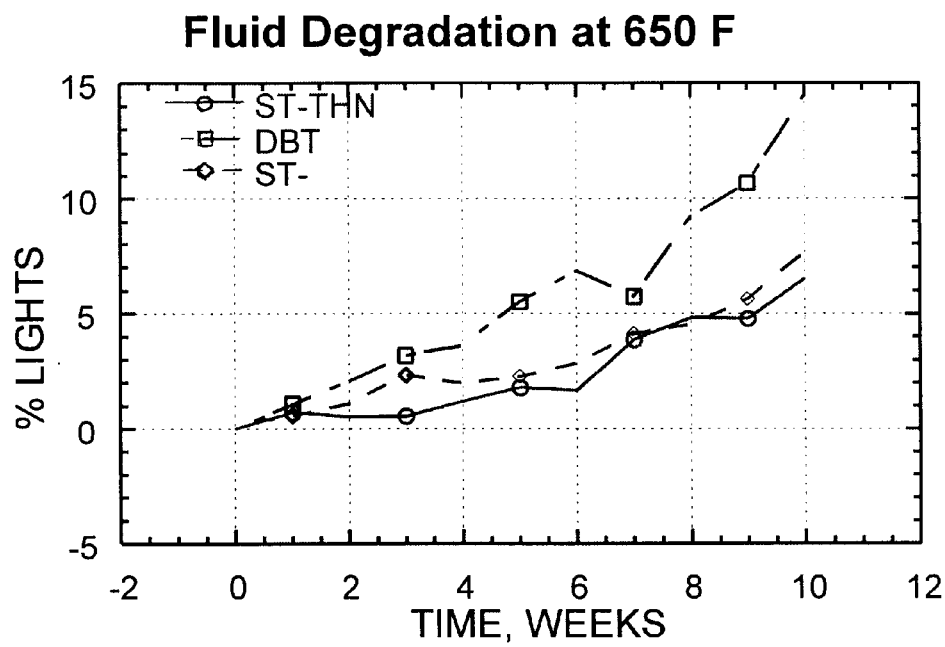
FIGS. 1A and 1B show fluid degradation of a mixture of 1,2,3,4-tetrahydro(1-phenylethyl)naphthalene (ST-THN) and dibenzyl toluene (DBT) compared to the fluid degradation of each component alone when tested at 650° F. (343° C.) and at 675° F. (357° C.).

DETAILED DISCUSSION OF PREFERRED EMBODIMENTS 1,2,3,4-Tetrahydro(1-phenylethyl)naphthalene, the first fluid component in the invention, is also called styrenated tetrahydronaphthalene (ST-THN), or 1-phenyl-1-tetrahydronaphthylehane (PTE), and is an isomeric mixture of 1,2,3,4-tetrahydro-5-(1-phenylethyl)naphthalene and 1,2,3,4-tetrahydro-6-(1-phenylethyl)naphthalene. ST-THN may be prepared by reaction of tetralin with styrene as described, for example, in Matsumoto et al., Ind. Eng. Chem., Prod. Res. Dev., Vol. 15, no. 3, 1976, pp. 215–216, which is herein incorporated by reference. ST-THN is also commercially available from The Dow Chemical Company as DOWTHERM™ RP heat transfer fluid.

Useful second fluids may be characterized as a fully aromatic component having alkyl, cyclohexyl, or cyclopentyl linkages, with the proviso that the second fluid is other than a degradation product of 1,2,3,4-tetrahydro(1-phenylethyl)naphthalene. Fully aromatic components include benzene, biphenyl, and naphthalene structures. Representative alkyl linkages include C1 to C4 linear or branched hydrocarbon moieties.

More specifically, the heat transfer fluid is admixed from: 1,2,3,4-tetrahydro(1-phenylethyl)naphthalene and an alkyl biphenyl $(R(C_6H_5)_2)$. Partially hydrogenated terphenyls $(C_6H_4(C_6H_5)(C_6H_{11})$ and $C_6H_4(C_6H_{11})_2)$, dibenzyl benzene $(C_6H_4(C_6H_5CH_2)_2)$, dibenzyl toluene $(C_6H_3(C_6H_5CH_2)_2(CH_3))$xylyl toluene $(C_6H_4(C_6H_4(CH_3)CH_2)(CH_3))$, dixylyl toluene $(C_6H_3(C_6H_4(CH_3)CH_2)_2(CH_3))$, xylyl xylene $(C_6H_3(C_6H_4(CH_3)CH_2)(CH_3)_2)$, dixylyl xylene $(C_6H_2(C_6H_4(CH_3)CH_2)_2(CH_3)_2)$, diethylbenzene $((C_6H_4)(CH_2CH_3)_2)$, 1,1-diphenylethane $(CH_3CH(C_6H_5)_2)$, benzene alkylates $((C_6H_{6-x})(R_x))$, alkylnaphthalenes $(C_{10}H_7R)$, diphenylmethane $(CH_2(C_6H_5)_2)$, cyclohexyl-diphenyl ether $((C_6H_5)O(C_6H_4)(C_6H_{11}))$, alkyldiphenylethers $((C_6H_5)O(C_6H_4)R)$, triphenylmethane $((C_6H_5)_3CH)$, tritolylmethane $((C_6H_4(CH_3))_3CH)$, and mixtures thereof are also used with some beneficial effect. In the formulas above, R is a straight or branched alkyl group having 1 to 4 carbon atoms, preferably 1; and x is 1 through 3, preferably 1.

More specifically, the heat transfer fluid is admixed from: 1,2,3,4-tetrahydro(1-phenylethyl)naphthalene and an alkyl biphenyl $(R_x(C_6H_y)_2$ where x is 1, 2, or 3, y is 3, 4, or 5, and R has, separately in each instance of occurrence of the R moiety in the formula, between 1 and 4 carbon atoms). Partially hydrogenated terphenyls $(C_6H_5)(C_6H_4)(C_6H_{11})$ and $(C_6H_4)(C_6H_{11})_2$, methylbiphenyl $(CH_3)(C_6H_4)(C_6H_5)$, ethylbiphenyl $(C_2H_5)(C_6H_4)(C_6H_5)$, diethylbiphenyl $(C_2H_5)_2(C_6H_4)_2$, triethylbiphenyl $(C_2H_5)_3(C_6H_4)(C_6H_3)$, propylbiphenyl $(C_3H_7)(C_6H_4)(C_6H_5)$, dipropylbiphenyl $(C_3H_7)_2(C_6H_4)_2$, isopropylbiphenyl $(CH_3)_2CH(C_6H_4)(C_6H_5)$, diisopropylbiphenyl $(CH_3)_2CH(C_6H_4)_2CH(CH_3)_2$, butylbiphenyl $(C_4H_9)(C_6H_4)(C_6H_5)$, dibutylbiphenyl $(C_4H_9)_2(C_6H_4)_2$, and 1,1-diphenylethane $(CH_3CH(C_6H_5)_2)$, and mixtures thereof are used with beneficial effect.

Preferably, the second fluid component is isopropylbiphenyl, diisopropylbiphenyl, triethylbiphenyl, a partially hydrogenated terphenyl, 1,1-diphenylethane, or a mixture thereof. Most preferably, the second fluid component is isopropylbiphenyl or diisopropylbiphenyl. Various heat transfer fluids are well-known in the art and many variations of such heat transfer fluids are, in alternative embodiments, useful in combination with the heat transfer fluid of the present invention.

In one embodiment, the second fluid component is partially hydrogenated terphenyl. The partially hydrogenated terphenyl has any combination of ortho-, meta-, and para-isomers. Partially hydrogenated terphenyl is commercially available, for example, from The Dow Chemical Company as DOWTHERM™ HT heat transfer fluid, as ThermS™ 900 heat transfer fluid from Nippon Steel Chemical Co., and from Solutia as THERMINOL™ 66 heat transfer fluid.

Preferably, the 1,2,3,4-tetrahydro(1-phenylethyl) naphthalene component comprises at least 10 percent by weight of the heat transfer fluid; more preferably, at least 25 percent. Preferably, the 1,2,3,4-tetrahydro(1-phenylethyl) naphthalene component comprises less than 90 percent by weight of the heat transfer fluid; more preferably, less than 75 percent. Unless otherwise stated herein, all percentages are given on a weight basis compared to the total weight of the heat transfer fluid.

Another embodiment of the present invention is a method for preparing a heat transfer fluid. The method comprises admixing a first fluid component of 1,2,3,4-tetrahydro(1-phenylethyl)naphthalene with an alkyl biphenyl second fluid component as described above.

Upon admixing 1,2,3,4-tetrahydro(1-phenylethyl) naphthalene and the second fluid component, a homogeneous heat transfer fluid may be obtained by mixing through any conventional means, such as pumping and recirculating. Ambient temperature and pressure are suitable mixing conditions.

The preferences described above also apply to this method embodiment, including choice of the second fluid component, and weight percent of the ST-THN component. Therefore, a preferred embodiment comprises admixing 1,2,3,4-tetrahydro(1-phenylethyl)naphthalene with an alkyl biphenyl as described above. A highly preferred embodiment comprises admixing at least 10 percent 1,2,3,4-tetrahydro(1-phenylethyl)naphthalene by weight with an alkyl biphenyl; more preferably, at least 25 percent 1,2,3,4-tetrahydro(1-phenylethyl)naphthalene by weight.

Another embodiment of the present invention is a method of controlling the temperature of a system. The method comprises adding to the system 1,2,3,4-tetrahydro(1-phenylethyl)naphthalene and an alkyl biphenyl as described above. In further embodiments of heat transfer fluids, alternative suggested second fluids are used in place of or with the alkyl biphenyl.

Suitable weight percents are as described herein above. Thus, a preferred embodiment comprises adding at least 25 percent 1,2,3,4-tetrahydro(1-phenylethyl)naphthalene by weight and an alkyl biphenyl to a system to control system temperature.

In accordance with the method of the present invention, a first fluid component of 1,2,3,4-tetrahydro(1-phenylethyl) naphthalene is, in one embodiment, admixed with the second fluid component prior to addition to the system; in another embodiment, the second fluid component is added to the system separately.

In a surprising and unexpected discovery, the blending of 1,2,3,4-tetrahydro(1-phenyl-ethyl)naphthalene and an isopropylbiphenyl provides a heat transfer fluid having superior thermal properties to the properties of a heat transfer fluid of either component used individually without the benefit of the other blended component. The heat transfer fluid blend of 1,2,3,4-tetrahydro(1-phenylethyl)naphthalene with triethylbiphenyl also demonstrates superior thermal properties to the properties of a heat transfer fluid of either component used individually without the benefit of the other blended component. In related experiments, blends of 1,2,3,4-tetrahydro(1-phenylethyl)naphthalene and 1,1-diphenylethane afford heat transfer fluids with superior thermal properties to the properties of a heat transfer fluid of either component used individually without the benefit of the other blended component. Similarly, when diisopropylbiphenyl is blended with partially hydrogenated terphenyls, the resulting heat transfer fluid has excellent thermal properties, superior to the properties of a heat transfer fluid of either component used individually without the benefit of the other blended component.

For a given amount of time, the heat transfer fluid blends of the present invention tend to form fewer heavy components, fewer light boiling components, and fewer carbon deposits in the heat exchange system; the heat transfer fluids of the present invention also demonstrate improved thermal stability over the thermal stability of the heat transfer fluid defined by one of the second component fluids prior to the admixing of 1,2,3,4-tetrahydro(1-phenylethyl)naphthalene. In this regard, light boiling components are components having boiling points lower than the boiling point of the heat transfer fluid prior to the onset of sustained exposure to temperatures which are expected in heat transfer fluid operational use.

The second fluid components are either commercially available or are prepared according to published procedures. Methylbiphenyl is available from Aldrich Chemical Company, or as SURE SOL™ 177 fluid from Koch Industries. Ethylbiphenyl is available from Aldrich Chemical Company or as ThermS™ 600 heat transfer fluid from Nippon Steel Chemical Co. Diethylbiphenyl is available as ThermS™ 700 heat transfer fluid from Nippon Steel Chemical Co. Triethylbiphenyl is available as ThermS™ 800 heat transfer fluid from Nippon Steel Chemical Co. Propylbiphenyl is available from TCI America. Isopropylbiphenyl is available from TCI America. It is also available as a mixture with diisopropylbiphenyl as SURE SOL™ 325 fluid from Koch Industries. Diisopropylbiphenyl is available from TCI America or as SURE SOL™ 330 fluid from Koch Industries. Butylated biphenyl is available as SURE SOL™ 290 fluid from Koch Industries. Other alkylated biphenyls are available in the market place as heat transfer fluids with a number of brand names. 1,1-Diphenylethane is available from Nisseki Chemical Texas Inc., or it can be prepared from styrene and benzene according to the procedure described in U.S. Pat. No. 4,011,274. Dibenzyltoluene, used in some comparative experiments, is available from Nisseki Chemical Texas Inc. The xylene derivative fluids may be prepared as described in Informations Chimie, vol. 33, No. 376 (1996) pp.93–96, which is herein incorporated by reference. Also, cyclohexyl-diphenyl ether, alkyldiphenylethers, and tritolylmethane are typically prepared according to conventional alkylation procedures. Dibenzyl toluene is commercially available from Huls as MARLOTHERM™ SH heat transfer fluid.

EXAMPLES

Preparation of a 50/50 mixture of ST-THN and DBT: A sample comprising a 1:1 weight ratio of ST-THN:dibenzyl toluene was prepared by admixing 550 grams of 1,2,3,4-tetrahydro(1-phenylethyl)naphthalene with 550 grams of dibenzyl toluene in a glass container. The mixture was stirred approximately five minutes at ambient pressure and temperature until a homogeneous fluid was obtained.

Preparation of a 50/50 mixture of ST-THN and HT: A sample comprising a 1:1 weight ratio of ST-THN:partially hydrogenated terphenyl (HT) was prepared in a similar manner by admixing 580 grams of 1,2,3,4-tetrahydro(1-phenylethyl)naphthalene with 580 grams of partially hydrogenated terphenyl.

Both of these fluid samples were subjected to thermal degradation at 650° F. (343° C.) and at 675° F. (357° C.) along with samples of 1,2,3,4-tetrahydro(1-phenylethyl)-naphthalene, dibenzyl toluene, and partially hydrogenated terphenyl by placing 40 milliliters of each fluid in a 16×1 inch (40.64×2.54 cm) carbon steel ampoule which had been evacuated and then purged with nitrogen. The fluid samples were heated in a forced air oven (V Series, from Despatch Industries, Inc.) during the experimental timeframe except for weekly removal for testing. Upon removal from the oven, the ampoules were cooled in dry ice before opening. The fluid samples were drained into separate containers and heated with heat lamps to complete the recovery of the degraded fluid. The resulting fluids were analyzed by gas chromatography to determine the percent of light boiling components in the fluid as an indication of fluid degradation. The lower the percentage of light boiling components, the less the fluid has degraded, therefore, the greater the thermal stability of the fluid. Table 1 below shows the results of the degradation tests involving dibenzyl toluene. Sample of 1,2,3,4-tetrahydro(1-phenylethyl)naphthalene (ST-THN), dibenzyl toluene (DBT), and a 50/50 mixture by weight of 1,2,3,4-tetrahydro(1-phenylethyl)naphthalene and dibenzyl toluene were tested at 650° F. (343° C.) for ten weeks and at 675° F. (357° C.) for nine weeks in accordance with the procedures described above.

Figure 1B:
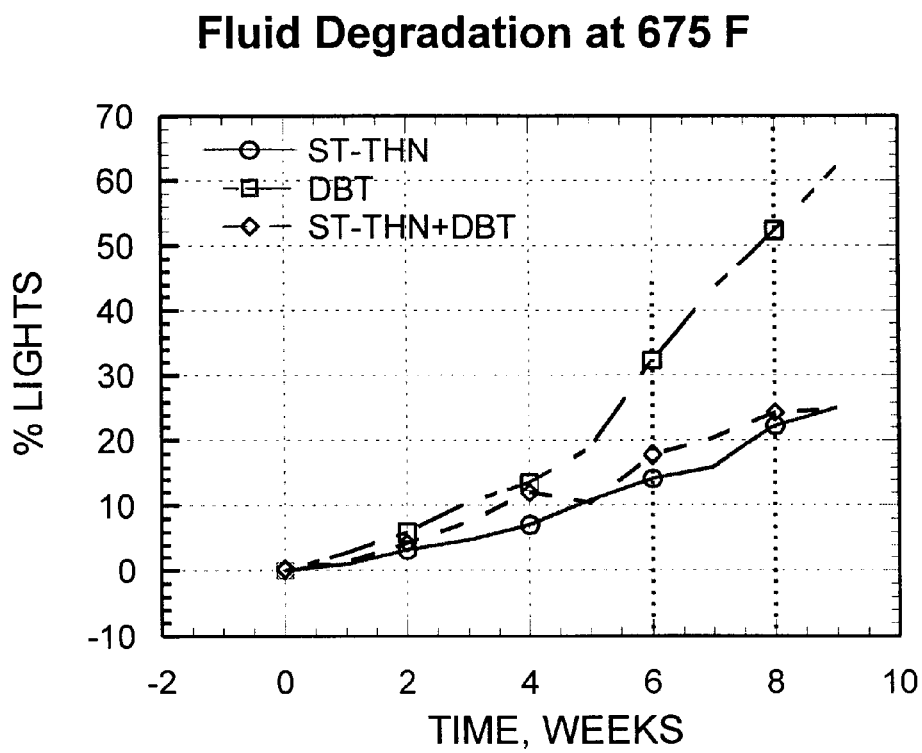

The data are listed in Table 1 and are plotted in FIGS. 1A and 1B. These figures show that DBT degrades significantly faster than either ST-THN alone or the mixture of ST-THN and DBT under the test conditions applied. Surprisingly, the thermal stability of the 50/50 mixture (ST-THN +DBT) closely paralleled that of the ST-THN fluid alone.

TABLE 1

Degradation of Fluids

| Duration (Weeks) | % Lights at 650° F. (343° C.) | | | % Lights at 675° F. (357° C.) | | |
|---|---|---|---|---|---|---|
| | ST-THN | DBT | ST-THN + DBT 50/50 | ST-THN | DBT | ST-THN + DBT 50/50 |
| 1 | 0.71 | 1.06 | 0.58 | 1.00 | 2.77 | 1.28 |
| 2 | 0.54 | 2.06 | 1.10 | 3.23 | 5.97 | 4.30 |
| 3 | 0.56 | 3.20 | 2.33 | 4.79 | 10.42 | 7.61 |
| 4 | 1.18 | 3.63 | 1.94 | 7.09 | 13.62 | 12.05 |
| 5 | 1.76 | 5.50 | 2.28 | 10.90 | 18.93 | 10.46 |
| 6 | 1.63 | 6.84 | 2.86 | 14.26 | 32.30 | 17.90 |
| 7 | 3.87 | 5.75 | 4.11 | 16.08 | 43.37 | 20.32 |
| 8 | 4.84 | 9.21 | 4.53 | 22.30 | 52.26 | 24.41 |
| 9 | 4.78 | 10.67 | 5.63 | 25.17 | 62.02 | 25.01 |
| 10 | 6.52 | 14.48 | 7.66 | — | — | — |

Figure 2A:
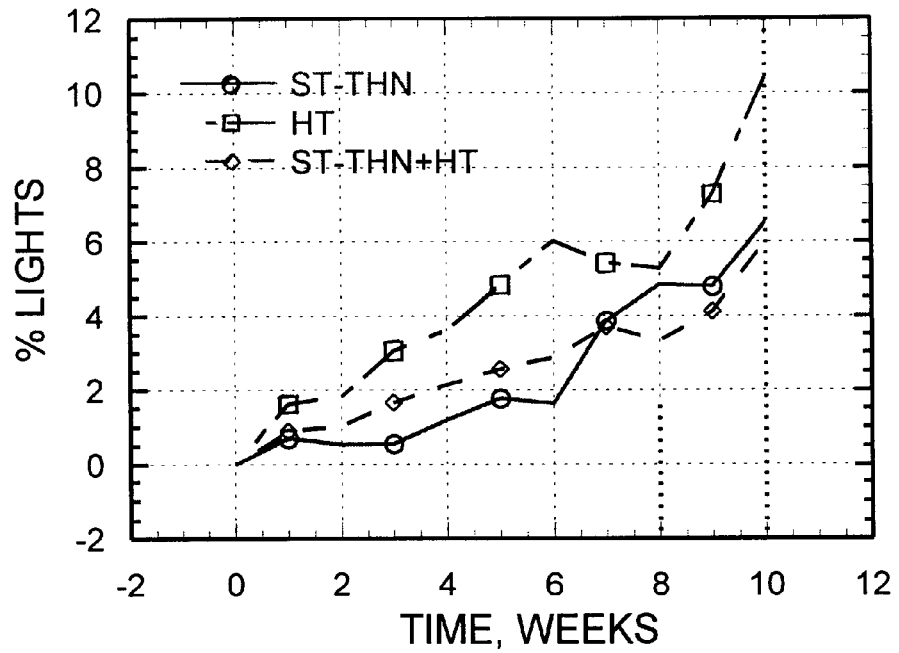
FIGS. 2A and 2B show fluid degradation of a mixture of 1,2,3,4-tetrahydro(1-phenylethyl)naphthalene (ST-THN) and partially hydrogenated terphenyl (HT) compared to the fluid degradation of each component alone when tested at 650° F. (343° C.) and at 675° F. (357° C.).
Figure 2B:
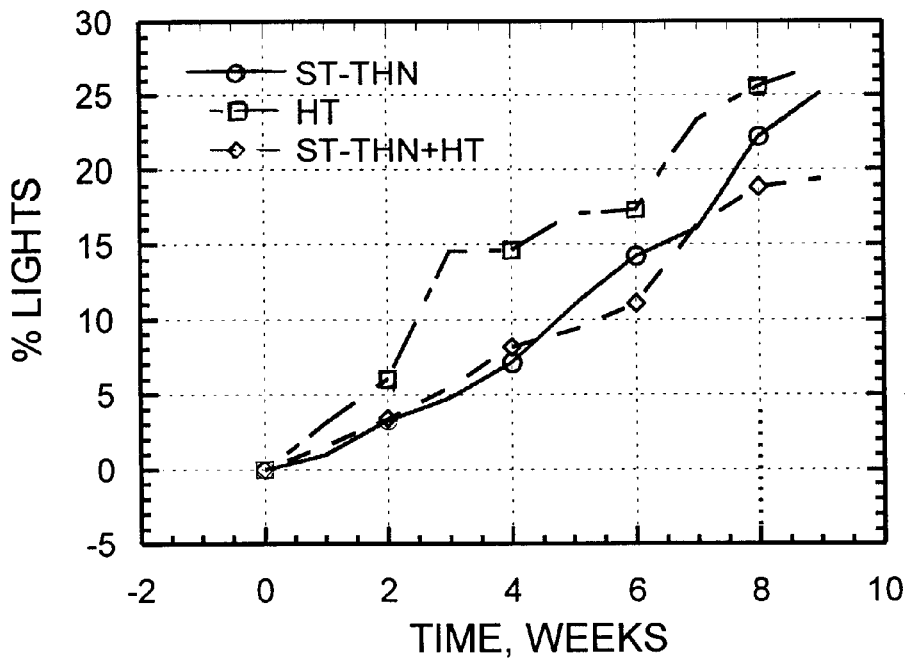

Similar results were obtained for the degradation tests involving partially hydrogenated terphenyl. Samples of ST-THN, HT, and a 50/50 mixture by weight percent of ST-THN and HT were tested at 650° F. (343° C.) and at 675° F. (357° C.) for ten weeks. The data are listed in Table 2 below and are plotted in FIGS. 2A and 2B. The 50/50 mixture of ST-THN and partially hydrogenated terphenyl interestingly exhibited thermal stability much closer to that of the superior heat transfer fluid ST-THN, than to the thermal stability of HT.

TABLE 2

Degradation of Fluids

| Duration (Weeks) | % Lights at 650° F. (343° C.) | | | % Lights at 675° F. (357° C.) | | |
|---|---|---|---|---|---|---|
| | ST-THN | HT | ST-THN + HT 50/50 | ST-THN | HT | ST-THN + HT 50/50 |
| 1 | 0.71 | 1.61 | 0.88 | 1.00 | 3.11 | 1.60 |
| 2 | 0.54 | 1.82 | 1.02 | 3.23 | 6.02 | 3.38 |
| 3 | 0.56 | 3.05 | 1.65 | 4.79 | 14.61 | 5.50 |
| 4 | 1.18 | 3.61 | 2.13 | 7.09 | 14.66 | 8.12 |
| 5 | 1.76 | 4.81 | 2.57 | 10.90 | 17.03 | 9.32 |
| 6 | 1.63 | 6.02 | 2.88 | 14.26 | 17.35 | 11.05 |
| 7 | 3.87 | 5.42 | 3.70 | 16.08 | 23.40 | 16.27 |
| 8 | 4.84 | 5.26 | 3.31 | 22.30 | 25.65 | 18.87 |
| 9 | 4.78 | 7.28 | 4.11 | 25.17 | 27.08 | 19.39 |
| 10 | 6.52 | 10.42 | 6.00 | 27.10 | 32.60 | 20.34 |

Tables 3 to 5 provide data obtained from fluid degradation experimental studies in carbon steel. Fluids were degraded by placing about forty grams of fluid in a fourteen inch carbon steel ampoule, sealed under nitrogen, and heated to the indicated temperature. One subset of the fluids were degraded under conditions such that samples were taken out of the oven after each week of degradation. A second subset of the fluids were degraded for a total of 500 hours at the given temperature, then the degradation rate was converted to degradation rate per week. In either case, once the fluids were degraded and taken out of the ampoule, they were analyzed by gas chromatography using ASTM method D2887, "Standard Test method for Boiling Range Distribution of Petroleum Fractions by Gas Chromatography." In performing an analysis, the amount of light boiling components was measured by comparing the presence of these components in the fluid before degradation and then also after degradation. The amount of high boiling components was similarly obtained. The amount of residue was measured by subjecting 4 grams of sample to vacuum distillation in a Kugelrohr ball-tube distillation apparatus with gradual increase of the temperature of the distillation to 250° C., under a vacuum enabled by a pressure of <0.7 mm absolute of Hg. When heavy components formed, they were observed as a ring of dark residue remaining in the distillation flask.

Table 3 shows the results of (a) blending DOWTHERM RP heat transfer fluid, abbreviated as ST-THN, with (1) diisopropylbiphenyls ((i-Pr)$_2$-BP) in the form of SURE SOL 330 (Trademark of Koch Industries) fluid, and (2) mixtures of monoisopropylbiphenyls (i-Pr-BP) and diisopropylbiphenyls ((i-Pr)$_2$-BP), in the form of SURE SOL 325 fluid, (3) partially hydrogenated terphenyls, denoted as PHT, and (b) degrading the blended fluid at 675° F. In Table 1, examples of the invention are shown with samples labeled: ST-THN+(i-Pr)$_2$-BP, 75/25; ST-THN+(i-Pr)$_2$-BP, 50/50; ST-THN+(i-Pr)$_2$-BP, 25/75; and ST-THN+(i-Pr-BP+(i-Pr)$_2$-BP) 50/50. Comparative examples are shown with samples labeled as: DOWTHERM RP (ST-THN); (i-Pr)$_2$-BP; i-Pr-BP+(i-Pr)$_2$-BP; and PHT.

TABLE 3

Comparative Fluid Degradation per Week, at 675° F.

| Fluid | % Lights | % Highers | % Residue | % Total Degradation |
|---|---|---|---|---|
| DOWTHERM RP (ST-THN) | 2.32 | <0.01 | <0.01 | 2.3 |
| ST-THN + (i-Pr)$_2$-BP, 75/25 | 1.74 | <0.01 | <0.01 | 1.7 |
| ST-THN + (i-Pr)$_2$-BP, 50/50 | 1.05 | <0.01 | 0.01 | 1.1 |
| ST-THN + (i-Pr)$_2$-BP, 25/75 | 0.67 | 0.03 | 0.01 | 0.7 |
| (i-Pr)$_2$-BP | 1.48 | 2.02 | 0.91 | 4.4 |
| i-Pr-BP + (i-Pr)$_2$-BP | 1.40 | 1.18 | 0.86 | 3.4 |
| ST-THN + (i-Pr-BP + (i-Pr)$_2$-BP) 50/50 | 1.30 | <0.01 | <0.01 | 1.3 |
| PHT | 3.20 | <0.01 | 0.40 | 3.6 |

Table 4 shows degradation results at a temperature of 667° F. It shows the results of (a) blending DOWTHERM RP heat transfer fluid, abbreviated as ST-THN, with (1) diisopropylbiphenyls ((i-Pr)$_2$-BP) in the form of SURE SOL 330 (Trademark of Koch Industries) fluid, and (2) mixtures of monoisopropylbiphenyls (i-Pr-BP) and diisopropylbiphenyls ((i-Pr)$_2$-BP), in the form of SURE SOL 325 fluid, (3) 1,1-diphenylethane, abbreviated as 1,1-DPE, some prepared in the laboratory, denoted as (SYN) and some of it obtained from Nisseki Chemical Texas Inc., and (b) degrading the blended fluid at 667° F. It also shows the degradation of triethylbiphenyl ((Et)$_3$ BP) in the form ThermS™ 800 heat transfer fluid. In Table 2, examples of the invention are shown with samples labeled: ST-THN+(i-Pr)$_2$-BP, (75-25); ST-THN+(i-Pr)$_2$-BP, (50-50); ST-THN+(i-Pr)$_2$-BP, (25-75); ST-THN +(i-Pr-BP +(i-Pr)$_2$-BP); (25-75 ST-THN +1,1-DPE (Nisseki); (25-75); and ST-THN+1,1-DPE-(SYN) (25-75). Comparative examples are shown with samples labeled as: DOWTHERM RP (ST-THN); 1,1-Diphenylethane (SYN); 1,1-Diphenylethane (Nisseki); and ((Et)$_3$ BP).

TABLE 4

Comparative Fluid Degradation per Week, at 667° F.

| Fluid | % Lights | % Highers | % Residue | % Total Degradation |
|---|---|---|---|---|
| DOWTHERM RP (ST-THN) | 2.00 | <0.01 | <0.01 | 2.0 |
| ST-THN + (i-Pr)$_2$-BP, (75-25) | 1.20 | <0.01 | <0.1 | 1.2 |
| ST-THN + (i-Pr)$_2$-BP, (50-50) | 0.90 | <0.01 | <0.1 | 0.9 |
| ST-THN + (i-Pr)$_2$-BP, (25-75) | 0.60 | <0.01 | <0.1 | 0.6 |
| ST-THN + (i-Pr-BP + (i-Pr)$_2$-BP) (25-75) | 0.70 | <0.01 | <0.01 | 0.7 |

TABLE 4-continued

Comparative Fluid Degradation per Week, at 667° F.

| Fluid | % Lights | % Highers | % Residue | % Total Degradation |
|---|---|---|---|---|
| 1,1-Diphenylethane (SYN) | 5.26 | 3.02 | 0.64 | 8.9 |
| ST-THN + 1,1-DPE-(SYN) (25-75) | 0.95 | 0.04 | 0.01 | 1.0 |
| 1,1-Diphenylethane (Nisseki) | 4.89 | 2.54 | 0.62 | 8.0 |
| ST-THN + 1,1-DPE (Nisseki) (25-75) | 1.07 | 0.05 | <0.01 | 1.1 |
| ((Et)$_3$ BP) | 2.10 | <0.01 | 0.14 | 2.2 |

These above data clearly show that, when the two components are blended, the resulting heat transfer fluid has superior thermal properties to the properties of a heat transfer fluid of either component used individually without the benefit of the second blended component. The blended heat transfer fluids further beneficially demonstrate a relatively minor formation of highers (heavy materials or residue).

Table 4 also shows, in a similar indicative manner, thermal stability comparison results with respect to blends of 1,1-diphenylethane and DOWTHERM RP heat transfer fluid. The resulting heat transfer fluid has superior thermal properties to the properties of a heat transfer fluid of either component used individually without the benefit of the second blended component. The blends also demonstrate either very minor or essentially no formation of highers or residue.

Table 5 shows that blends of triethylbiphenyl, as ThermS™ 800 heat transfer fluid from Nippon Steel Chemical Co., and DOWTHERM RP heat transfer fluid also have excellent thermal stability. In Table 5, examples of the invention are shown with samples labeled: ST-THN+DBT (N) (50-50); ST-THN+PHT (50-50); ((Et)$_3$ BP)+ST-THN (75-25); ((Et)$_3$ BP)+ST-THN (50-50); and ((Et)$_3$ BP)+ST-THN (25-75). Comparative examples are shown with samples labeled as: (i-Pr)$_2$-BP; PHT; (i-Pr)$_2$-BP+PHT (50-50); Dibenzyltoluene (Nisseki); (i-Pr)$_2$-BP+DBT (N) (50-50); DOWTHERM RP (ST-THN); and ((Et)$_3$ BP).

The blends demonstrate only minor formation of highers and only a small amount of residue. The blends show superior thermal properties to the properties of a heat transfer fluid of either component used individually without the benefit of the second blended component.

Table 5 also shows that blends of diisopropylbiphenyls, as SURE SOL 330 fluid, and partially hydrogenated terphenyls also demonstrate superior thermal properties to the properties of a heat transfer fluid of either component used individually without the benefit of the second blended component. The blended cases demonstrate low formation of lights, a very low formation of highers, and a lower formation of residue than demonstrated by either component used individually without the benefit of the second blended component.

TABLE 5

Comparative Fluid Degradation per Week, at 675° F.

| Fluid | % Lights | % Highers | % Residue | % Total Degradation |
|---|---|---|---|---|
| (i-Pr)$_2$-BP | 1.16 | 2.12 | 0.40 | 3.7 |
| PHT | 2.73 | 0.03 | 0.63 | 3.4 |
| (i-Pr)$_2$-BP + PHT (50-50) | 1.50 | 0.08 | 0.31 | 1.9 |
| Dibenzyltoluene (Nisseki) | 4.19 | 5.18 | 5.49 | 14.9 |
| (i-Pr)$_2$-BP + DBT (N) (50-50) | 3.15 | 1.68 | 2.60 | 7.4 |
| ST-THN + DBT (N) (50-50) | 1.71 | 0.26 | 0.34 | 2.3 |
| ST-THN + PHT (50-50) | 1.77 | <0.01 | 0.10 | 1.9 |
| DOWTHERM RP (ST-THN) | 2.32 | <0.01 | <0.01 | 2.3 |
| ((Et)$_3$ BP) | 2.6 | <0.01 | 0.45 | 3.0 |
| ((Et)$_3$ BP) + ST-THN (75-25) | 2.0 | <0.01 | 0.03 | 2.0 |
| ((Et)$_3$ BP) + ST-THN (50-50) | 2.0 | <0.01 | 0.01 | 2.0 |
| ((Et)$_3$ BP) + ST-THN (25-75) | 2.0 | <0.01 | 0.02 | 2.0 |

The results from these experiments show that blends of 1,2,3,4-tetrahydro(1-phenyl-ethyl)naphthalene and alkyl biphenyls demonstrate superior thermal properties to the properties of a heat transfer fluid of either component used individually without the benefit of the other blended component. The same observation (Table 4) is made with blends of 1,2,3,4-tetrahydro(1-phenylethyl)naphthalene and 1,1-diphenylethane type compounds. In both of the above cases, there is a very low relative formation of higher boiling components and of residue. In the case of blends of alkyl biphenyls with partially hydrogenated terphenyls, there is some relative formation of residue; but the heat transfer fluid obtained from the blend has better thermal performance that the thermal performance of a heat transfer fluid of either component used individually without the benefit of the second blended component.

For comparative purposes, dibenzyltoluene was degraded neat and as a blend with diisopropylbiphenyl, as SURE SOL 330, and showed no unusual improvements. The degradation of a blend of dibenzyltoluene and 1,2,3,4-tetrahydro(1-phenylethyl)-naphthalene is also included for comparison.

In considering the next set of examples with results shown in Tables 7-13 and FIGS. 3-11, DIN method 51528 titled "Testing of Mineral Oils and Related Products. Determination of Thermal Stability of Unused Heat Transfer Fluids," DIN German Institute for Standardization e. V., Berlin, Germany, describes in some detail the procedures to be followed to test fluids for thermal stability. It describes the procedure for loading and unloading the fluids. It specifies the method of analyzing the fluid, and identifies the specific variables to be determined from the analytical results, such as: gaseous decomposition products, low boiling products, high boiling products, and nonvolatile products.

In order to test the thermal degradation of low pressure heat transfer fluids, the following fluids were degraded at 675° F., for 500 hrs: 1,2,3,4-tetrahydro (1-phenylethyl) naphthalene(ST-THN), partially hydrogenated terphenyl, dibenzyltoluene, and a 50/50 blend of 1,2,3,4-tetrahydro(1-phenylethyl)-naphthalene) and diisopropylbiphenyl (DIPBP), using DIN 51528 test method. The testing was done in triplicate. However, one ampoule containing dibenzyltoluene fluid leaked during the test. As a result, the results for this fluid are based on only two samples.

1,2,3,4-Tetrahydro(1-phenylethyl)naphthalene was obtained as DOWTHERM* RP(trademark of the Dow Chemical Company) fluid, partially hydrogenated terphenyl was obtained as Therminol-66(trademark of Solutia) fluid, dibenzyltoluene was obtained as Marlotherm SH(trademark of Huls) fluid, and diisopropylbiphenyl was obtained as Sure Sol-330 (trademark of Koch Chemical Company) fluid. It contained 90% diisopropylbiphenyl and 10% other alkylbiphenyls.

EXPERIMENTAL

DIN 51528 test method was followed, with the exception that carbon steel was used with last two fluids instead of stainless steel. The loading and unloading of the ampoules was done as described in the method.

The amount of gas was measured by weighing the degraded fluids in the vessel before and after opening the ampoules. Table 6 presents information in gas chromatographic analytical considerations.

ANALYTICAL

The gas chromatographic analysis of new and degraded fluids was done using ASTM test method D-2887, "Standard Test Method for Boiling Range Distribution of Petroleum Fraction by Gas Chromatography," using the following conditions.

TABLE 6

GC Conditions

| | |
|---|---|
| Instrument: | Hewlett-Packard 5890A GC |
| Column: | 15 m x 0.25 mm I.D., 0.1-$\mu$m film thickness, Rtx-1 (100% dimethylpolysiloxane) capillary column (Restek Corporation) |
| Temperatures: | |
| Oven: | 50° C. - 1 min hold - 15° C./min - 320° C. - 2 min hold |
| Injector: | 250° C. |
| Detector: | 320° C. |
| Detection: | Flame Ionization Detection (FID) |
| Flows: | |
| Carrier: | 1.4 mL/min, 10 psig head pressure |
| Air: | 347 mL/min |
| Hydrogen: | 35 mL/min |
| Make-up: | Helium, 26 mL/min |
| Split: | 50 mL/min |
| GC Range 2: | 5 |
| GC Attenuation: | 0 |
| Integrator: | Hewlett-Packard 3396A Computing Integrator |
| Quantitation: | Area Percent |
| Autoinjector: | Hewlett-Packard 7673, equipped with a nanoliter adapter |
| Volume: | 1 (10-$\mu$L syringe, 0.2 $\mu$L injection volume) |
| Injector Rinse solvent: | Methylene chloride |
| # of Sample Washes: | 6 |
| # of Solvent Washes: | 6 |

Figure 3:
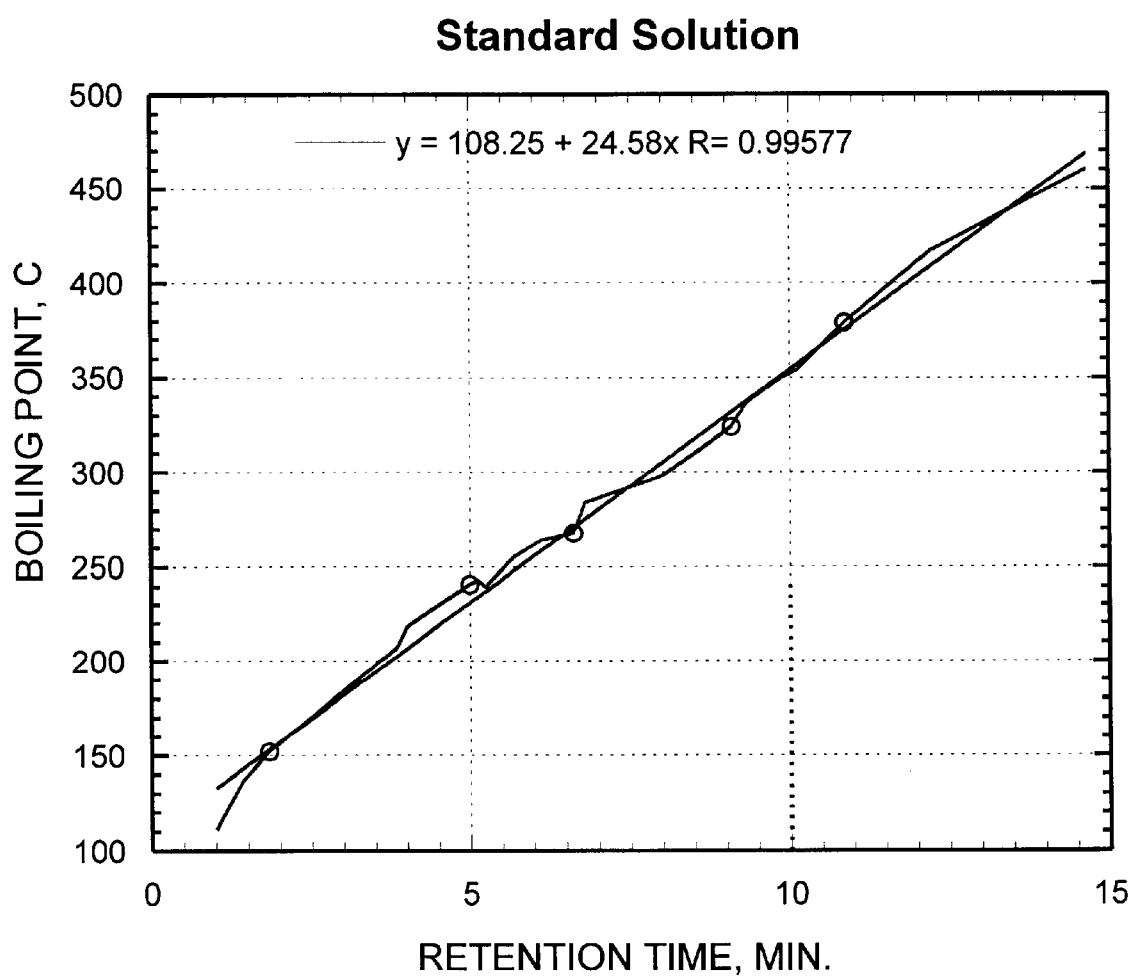
FIG. 3 shows a Boiling Point—Retention Time relationship for a standard solution of alkyl aromatics.
Figure 4:
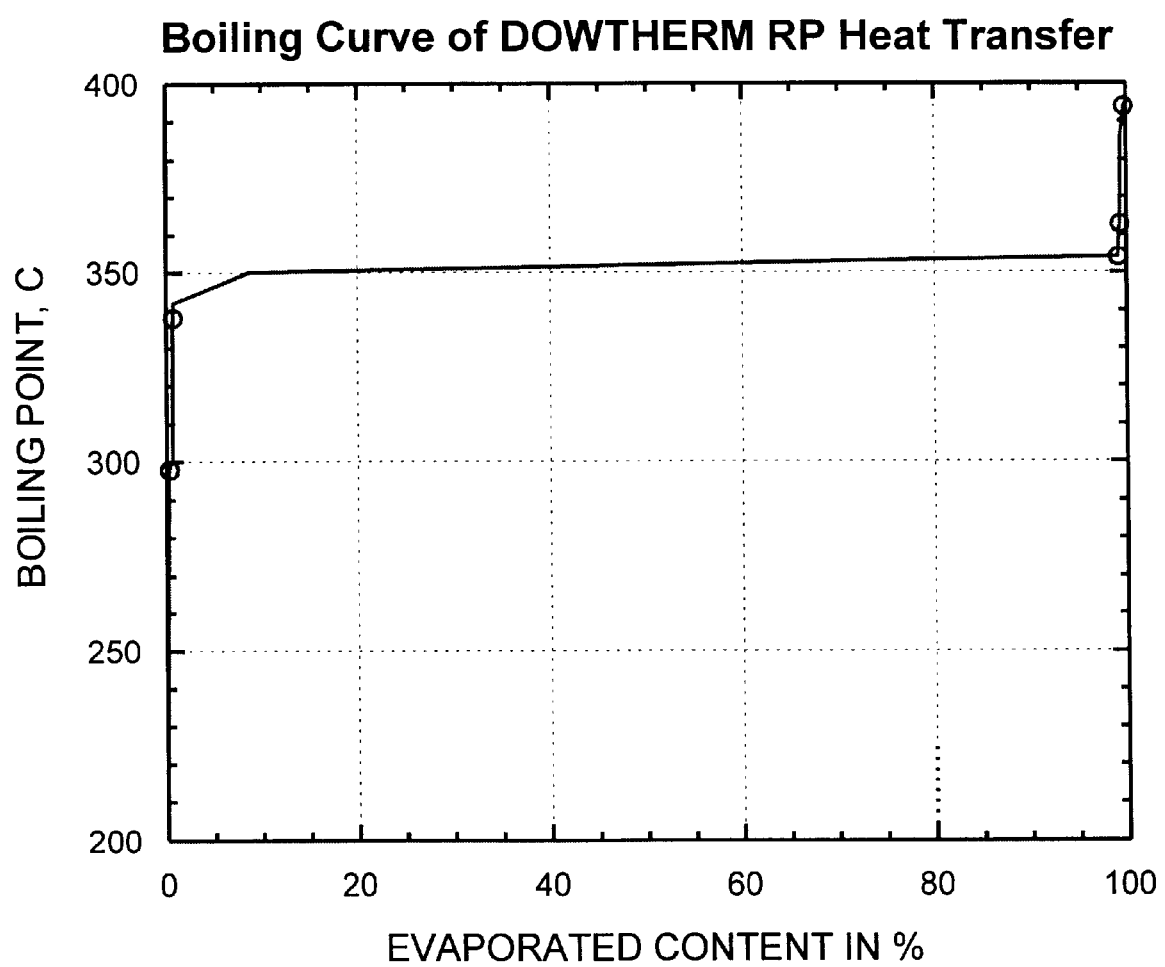
FIG. 4 presents a Boiling Point—Evaporated Content relationship for DOWTHERM™ RP heat transfer fluid.
Figure 5:
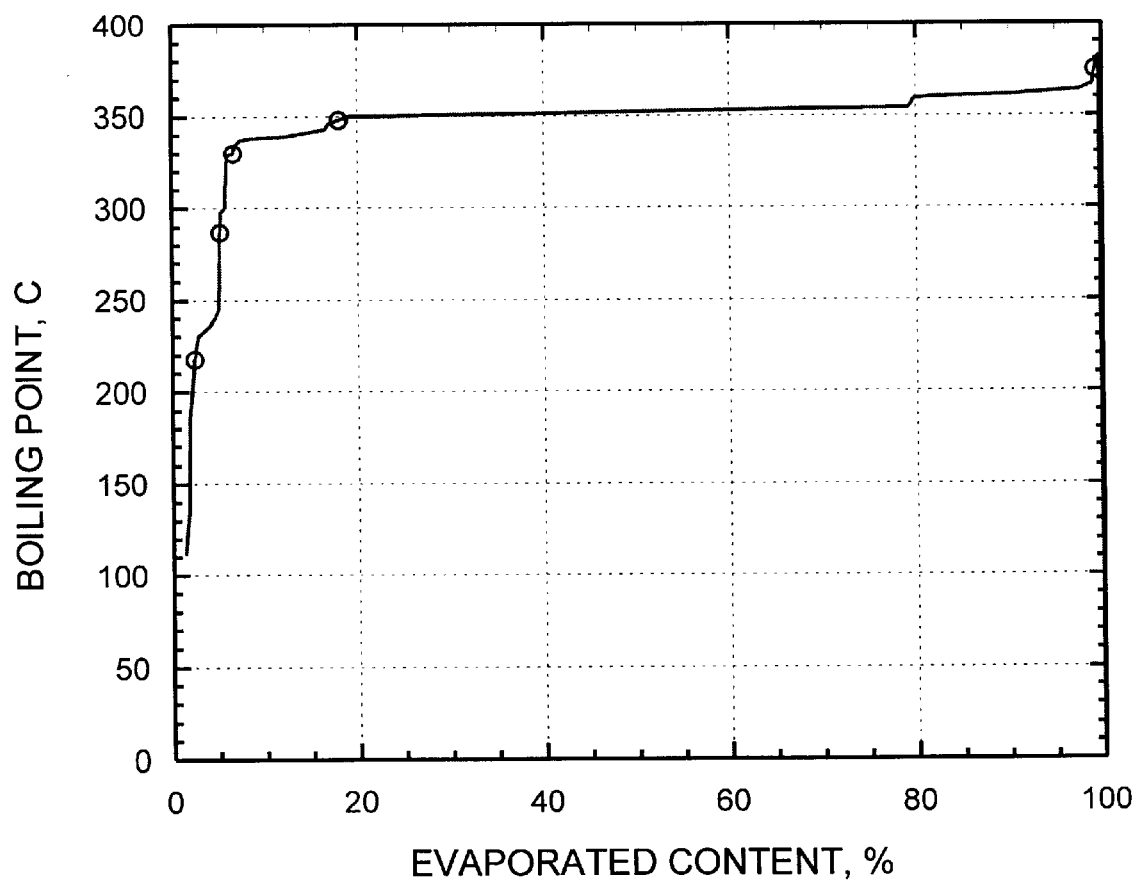
FIG. 5 presents a Boiling Point—Evaporated Content relationship for degraded DOWTHERM™ RP heat transfer fluid.
Figure 6:
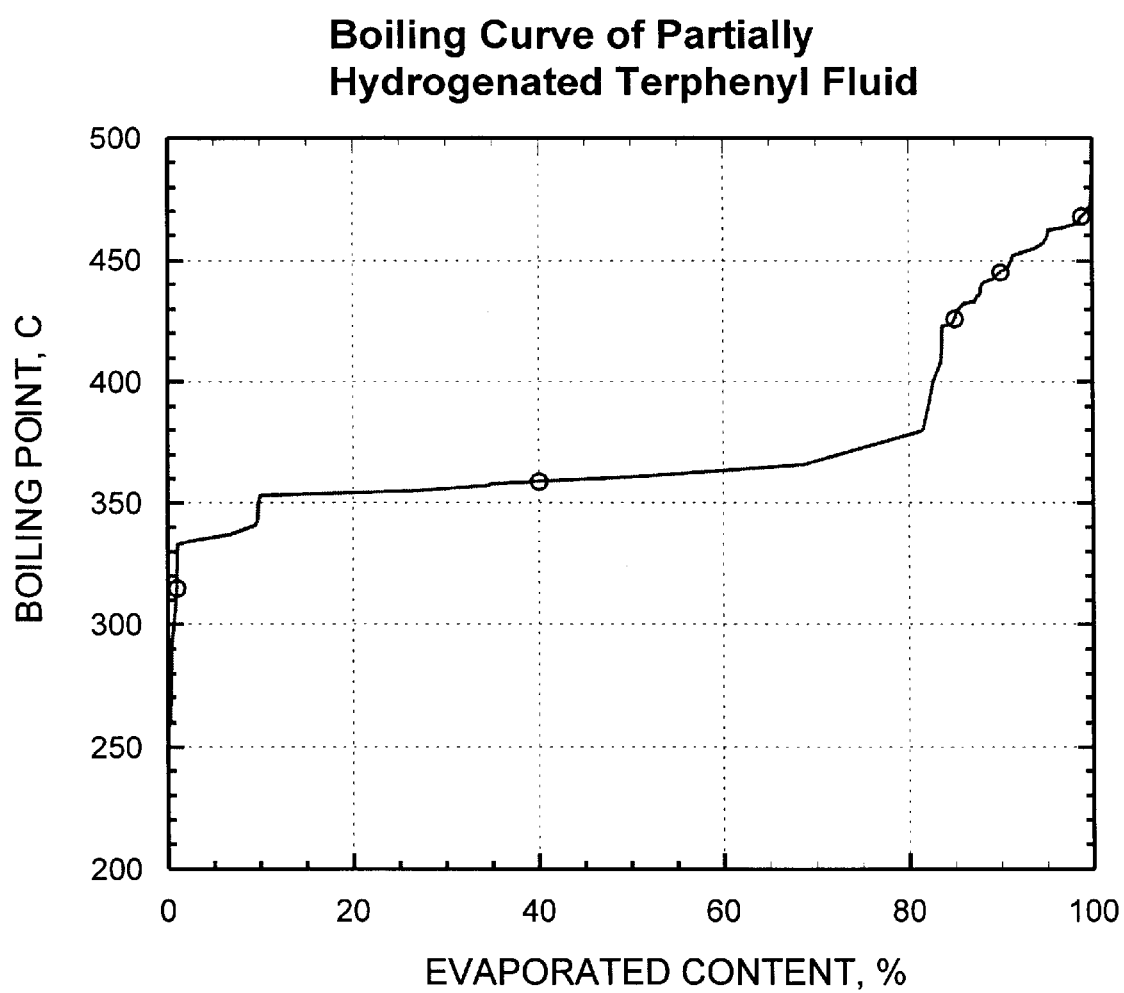
FIG. 6 presents a Boiling Point—Evaporated Content relationship for Partially Hydrogenated Terphenyl Fluid.
Figure 7:
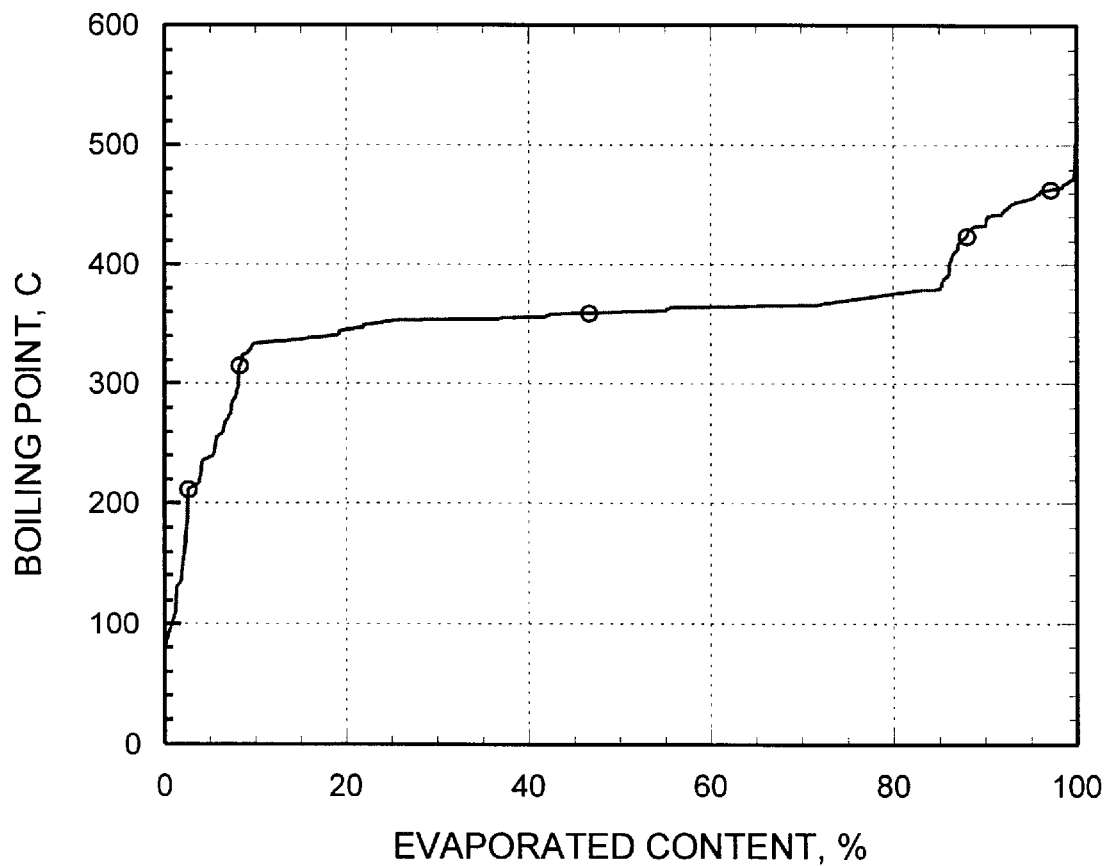
FIG. 7 presents a Boiling Point—Evaporated Content relationship for degraded Partially Hydrogenated Terphenyl Fluid.
Figure 8:
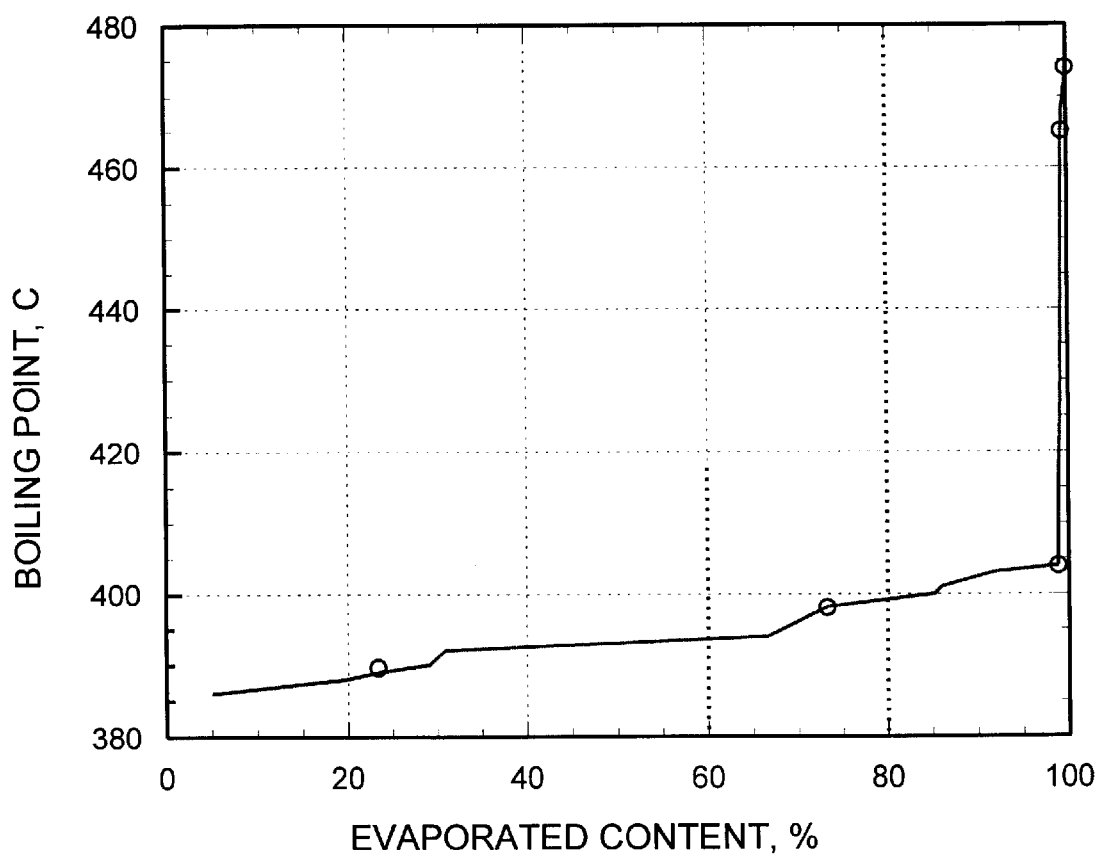
FIG. 8 presents a Boiling Point—Evaporated Content relationship for Dibenzyltoluene.
Figure 9:
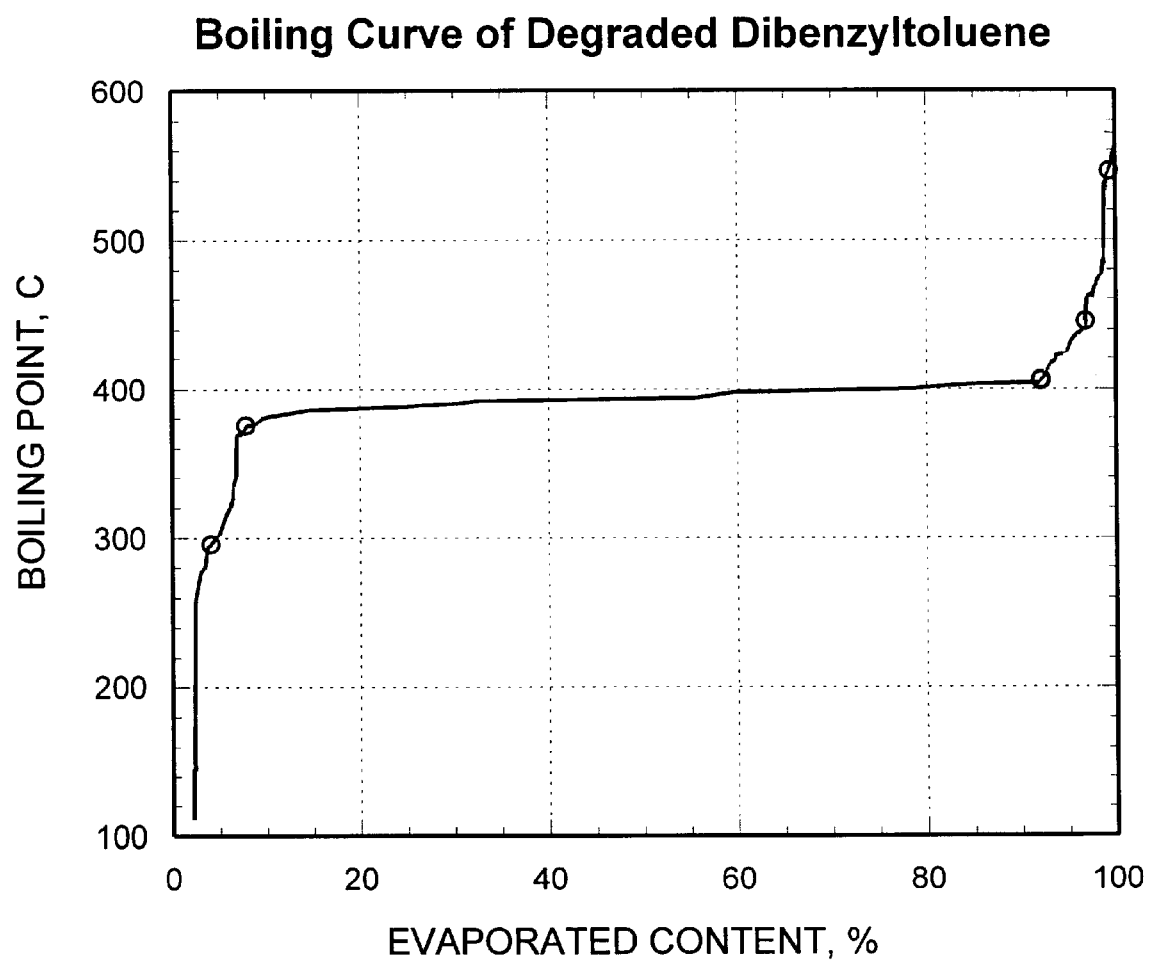
FIG. 9 presents a Boiling Point—Evaporated Content relationship for degaded Dibenzyltoluene.
Figure 10:
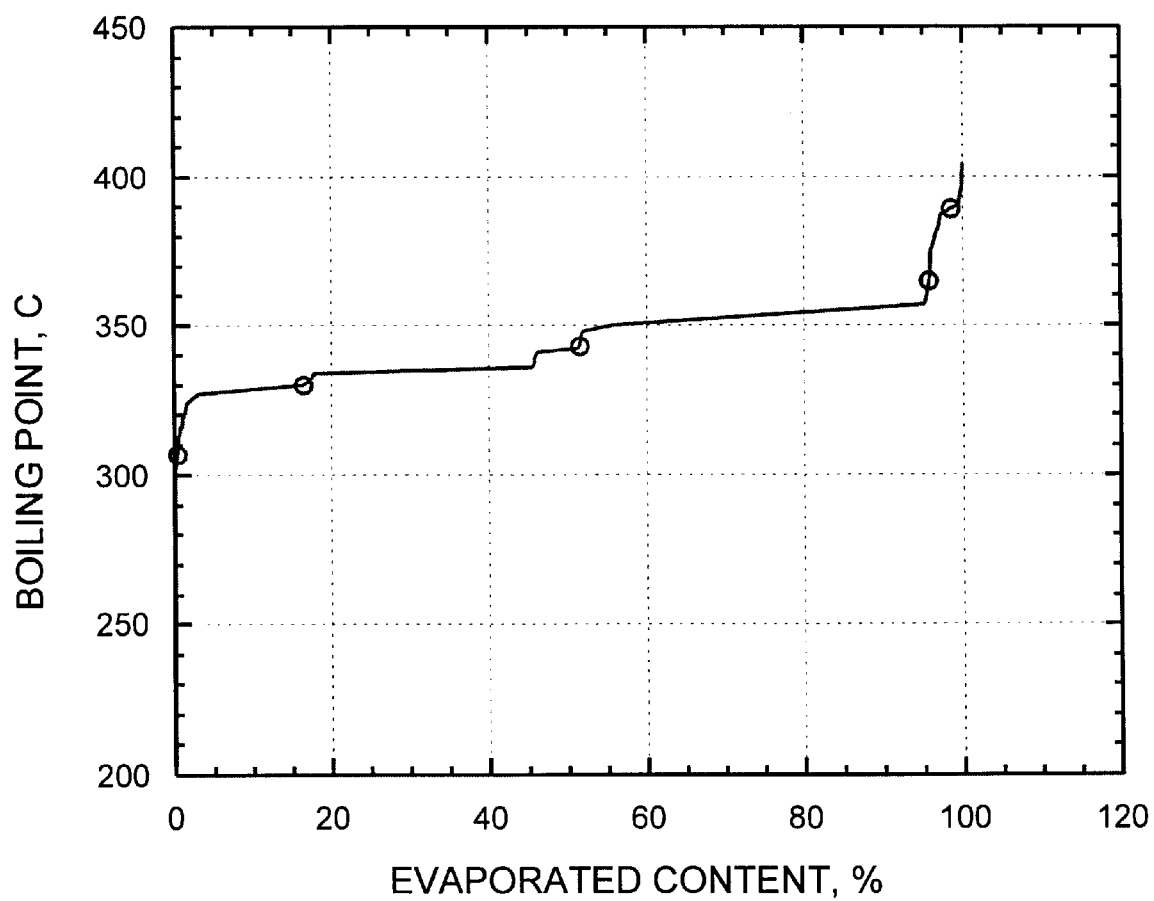
FIG. 10 presents a Boiling Point—Evaporated Content relationship for a 50/50 Blend of ST-THN and a DIPBP Fluid.
Figure 11:
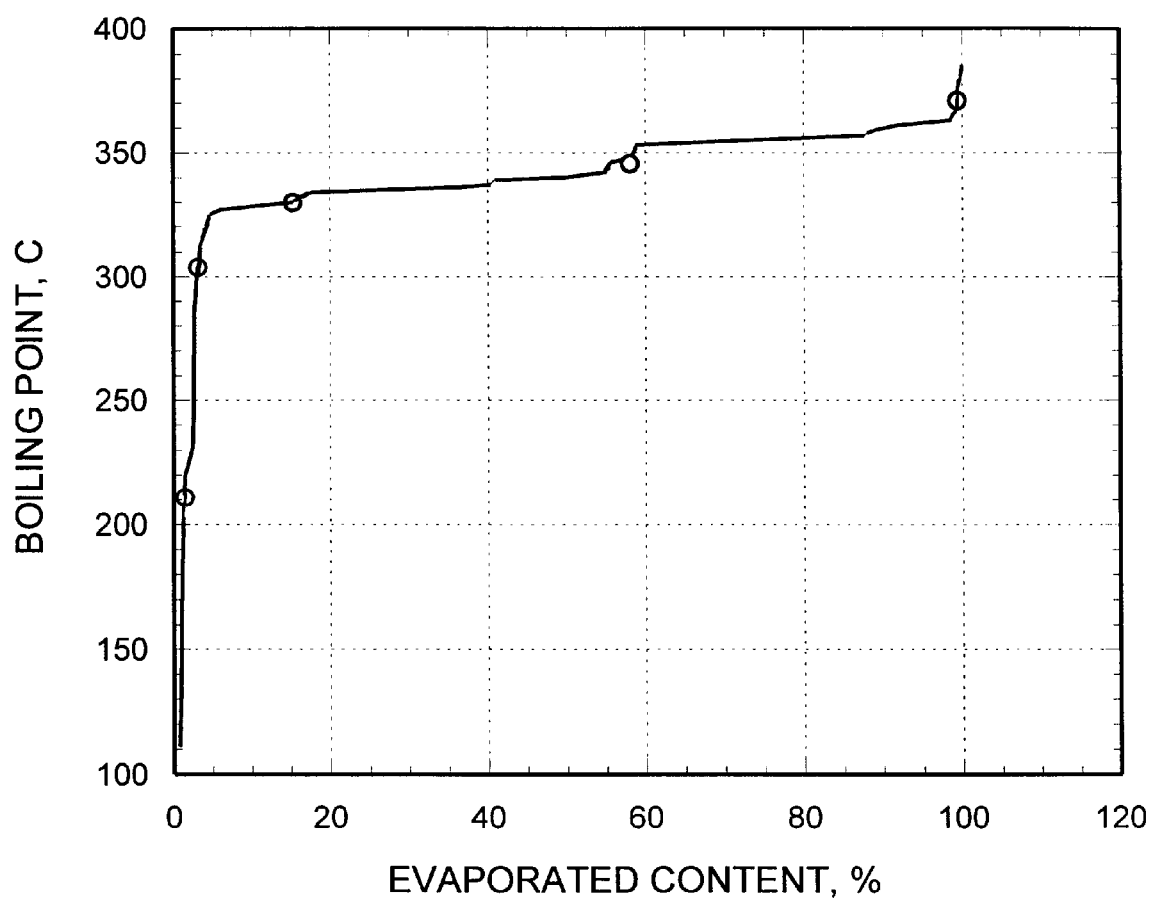
FIG. 11 presents a Boiling Point—Evaporated Content relationship for a degraded 50/50 Blend of ST-THN and DIPBP Fluid.

The gas chromatographic analysis of new and degraded fluids was done using ASTM test method D-2887, "Standard Test Method for Boiling Range Distribution of Petroleum Fraction by Gas Chromatography." Initially a standard solution is analyzed by gas chromatography to correlate retention time to boiling point. Table 7 describes the components used, the source, the boiling points and the retention times; and FIG. 3 shows a plot of the Table 7 data.

TABLE 7

Standard Solution, Boiling Point versus Retention Time Gas Chromatography, FID

| Component | Boiling Point, ° C. | Retention Time min. | Amount, g. | Source |
|---|---|---|---|---|
| Toluene | 111 | 1.000 | 2.0 | Aldrich |
| Ethylbenzene | 136 | 1.413 | 1.0 | Aldrich |
| Cumene | 152 | 1.828 | 2.0 | Aldrich |
| Butylbenzene | 183 | 2.949 | 2.0 | Aldrich |
| Tetrahydronaphthalene | 207 | 3.831 | 1.0 | Aldrich |
| Naphthalene | 218 | 3.997 | 2.0 | Aldrich |
| 2-Methylnaphthalene | 241 | 4.987 | 2.0 | Aldrich |
| 1-Methylnaphthalene | 243 | 5.110 | 1.0 | Aldrich |
| Cyclohexylbenzene | 240 | 5.245 | 1.0 | Aldrich |
| Biphenyl | 255 | 5.690 | 1.0 | Aldrich |
| Diphenylmethane | 264 | 6.114 | 2.0 | Aldrich |
| 4-Methylbiphenyl | 268 | 6.607 | 1.0 | TCI America |
| 1,2-Diphenylethane | 284 | 6.796 | 1.0 | Aldrich |
| cis-1-Methyl-3-phenylindan | 298 | 7.991 | 2.0* | Internal |
| trans-1-Methyl-3-phenylinda | 300 | 8.093 | * | |
| 1,3-Diphenyl-1-butene | 313 | 8.639 | * | |
| 1-Phenylnaphthalene | 324 | 9.082 | 0.5 | Aldrich |
| o-Terphen | 337 | 9.331 | 2.0 | Aldrich |
| 1,2,3,4-Tetrahydro-5-(1-phenyl-ethylnaphthalene) | 350 | 9.862 | 10.0** | Internal |
| 1,2,3,4-Tetrahydro-6-(1-phenyl-ethylnaphthalene) | 354 | 10.114 | ** | |
| m-Terphenyl | 379 | 10.860 | 2.1 | Aldrich |
| 9-Phenylanthracene | 417 | 12.207 | 0.5 | Aldrich |
| 1,3,5-Triphenylbenzene | 460 | 14.648 | 0.25 | Aldrich |

*The sample contained both cyclic styrene dimers and the linear dimer.
**The product normally contains a ten to one ratio of the 6 to 5 isomer Once the correlation was done, the fluids were analyzed by the same method. The starting fluid was then analyzed by gas chromatography. The initial boiling point and final boiling point of the fluid are determined by calculating the cumulative area percent of the chromatogram. The initial boiling point is the boiling point of the component at 0.5% of the cumulative area, and the final boiling point is the boiling point of the component at 99.5% of the cumulative area. This determines the boiling range for the new fluid. After the fluid is degraded, it is analyzed in the same way to determine the initial and final boiling points of the degraded fluid. The amount of light boiling products is the amount of components boiling between the initial boiling points of the new and degraded fluids. Similarly, the amount of high boiling products is determined by measuring the area % of components boiling between the final boiling points of the new and degraded fluids.

The amount of nonvolatile decomposition products was done by heating 4 g of degraded sample in a ball-tube distillation apparatus slowly to 250° C. at 1 mbar. The fluid was heated slowly to 230° C., held there for one hour, then heated to 250° C., and held there for 15 minutes.

RESULTS

The amount of gaseous products was small, less than 0.5% of the total fluid.

The first two fluids (Tables 8 and 9) were tested both in stainless steel and carbon steel ampoules. No major difference was observed in the degradation results. The last three fluids (Tables 10, 11, and 12) were tested only in carbon steel ampoules. A test report is given for each one of the fluids in Tables 8–12. A summary of the results is included in Table 13. Results are also presented in graphical form in FIGS. 4 to 11.

The total degradation measured for 1,2,3,4-tetrahydro(1-phenylethyl)naphthalene was 5.7–6.5%, that for partially hydrogenated terphenyl was 9.4–10.3%, and 14.2% for dibenzyltoluene. Surprisingly, the 50/50 blend of 1,2,3,4-tetrahydro(1-phenylethyl)naphthalene and diisopropylbiphenyl(DIPBP) had a very low total degradation of only 3.4%, lower than that of either component fluid. It had no formation of high boiling components, and a low formation of nonvolatile decomposition products. The main degradation products were light boiling components.

TABLE 8

Test Report for 1,2,3,4-Tetrahydro(1-phenylethyl)naphthalene Heat Transfer Fluid

| Metal | Carbon steel | Stainless steel |
|---|---|---|
| Test duration: | 500 hr | 500 hr |
| Test temperature: | 357° C., 675° F. | 357° C., 675° |
| Beginning of boiling of the new fluid: | 300° C. | 300° C. |
| End of boiling of the new fluid: | 389° C. | 386° C. |
| Beginning of boiling of degraded fluid: | 111° C. | 111° C. |
| End of boiling of degraded fluid: | 381° C. | 381° C. |
| Gaseous decomposition products: | 0.15% (0.11, 0.22, 0.11) | 0.32% (0.31, 0.31, 0.35) |
| Low boiling components: | 5.52% (5.56, 5.60, 5.39) | 6.18% (6.17, 6.19, 6.17) |
| High boiling components: | 0.0% | 0.0% |
| Nonvolatile decomposition products: | 0.04% (0.02, 0.04, 0.05) | 0.04% (0.08, 0.01, 0.02) |
| Total degree of decomposition: | 5.7% | 6.5% |
| Conditions deviating from the standard: | use of carbon steel | none, stainless steel used |

TABLE 9

Test Report for Partially Hydrogenated Terphenyl Heat Transfer Fluid

| Metal | Carbon steel | Stainless steel |
|---|---|---|
| Test duration: | 500 hr | 500 hr |
| Test temperature: | 357° C., 675° F. | 357° C., 675° F. |
| Beginning of boiling of the new fluid: | 310° C. | 310° C. |
| End of boiling of the new fluid: | 471° C. | 471° C. |
| Beginning of boiling of degraded fluid: | 111° C. | 111° C. |
| End of boiling of degraded fluid: | 472° C. | 472° C. |
| Gaseous decomposition products: | 0.17% (0.15, 0.11, 0.26) | 0.40% (0.40, 0.40, 0.40) |
| Low boiling components: | 7.91% (8.03, 7.40, 8.29) | 8.83% (8.73, 8.83, 8.92) |
| High boiling components: | 0.0% | 0.0% |
| Nonvolatile decomposition products: | 1.29% (1.12, 1.35, 1.39) | 1.09% (1.05, 1.13, 1.08) |
| Total degree of decomposition: | 9.4% | 10.3% |
| Conditions deviating from the standard: | use of carbon steel | none, stainless steel used |

TABLE 10

Test Report for Dibenzyltoluene Heat Transfer Fluid

| Metal | Carbon steel |
|---|---|
| Test duration: | 500 hr |
| Test temperature: | 357° C., 675° F. |
| Beginning of boiling of the new fluid: | 386° C. |
| End of boiling of the new fluid: | 472° C. |
| Beginning of boiling of degraded fluid: | 111° C. |
| End of boiling of degraded fluid: | 550° C. |
| Gaseous decomposition products: | 0.24% (0.26, 0.22) |
| Low boiling components: | 10.02% (9.99, 10.05) |
| High boiling components: | 1.44% (1.50. 1.38) |
| Nonvolatile decomposition products: | 2.77% (2.58, 2.96) |
| Total degree of decomposition: | 14.2% |
| Conditions deviating from the standard: | use of carbon steel |

TABLE 11

Test Report for Diisopropylbiphenyl Heat Transfer Fluid

| Metal | Carbon steel |
|---|---|
| Test duration: | 500 hr |
| Test temperature: | 357° C., 675° F. |
| Beginning of boiling of the new fluid: | 325° C. |
| End of boiling of the new fluid: | 370° C. |
| Beginning of boiling of degraded fluid: | 311° C. |
| End of boiling of degraded fluid: | 389° C. |
| Gaseous decomposition products: | * |
| Low boiling components: | 3.14% (3.17, 3.39, 2.86) |
| High boiling components: | 3.51% (3.81, 3.74, 2.98) |
| Nonvolatile decomposition products: | 2.72% (2.60, 2.84) |
| Total degree of decomposition: | 9.4% |
| Conditions deviating from the standard: | use of carbon steel, gases not measured |

TABLE 12

Test Report for 50/50 Blend of 1,2,3,4-Tetrahydro(1-phenylethyl)-naphthalene and Diisopropylbiphenyl Heat Transfer Fluid

| Metal | Carbon steel |
|---|---|
| Test duration: | 500 hr |
| Test temperature: | 357° C., 675° F. |
| Beginning of boiling of the new fluid: | 313° C. |
| End of boiling of the new fluid: | 397° C. |
| Beginning of boiling of degraded fluid: | 111° C. |
| End of boiling of degraded fluid: | 376° C. |
| Gaseous decomposition products: | 0.29% (0.31, 0.38, 0.19) |
| Low boiling components: | 3.38% (3.45, 3.62, 3.08) |
| High boiling components: | 0.0% |
| Nonvolatile decomposition products: | 0.03% (0.01, 0.02, 0.07) |
| Total degree of decomposition: | 3.4% |
| Conditions deviating from the standard: | use of carbon steel |

TABLE 13

Summary of Fluid Degradation
500 hr, 357° C. (675° F.),

| Fluid | A | B | C | D | E |
|---|---|---|---|---|---|
| Beginning of boiling of the new fluid, ° C.: | 300 | 310 | 386 | 325 | 313 |
| End of boiling of the new fluid, ° C.: | 389 | 471 | 472 | 370 | 390 |
| Beginning of boiling of degraded fluid, ° C.: | 111 | 111 | 111 | 311 | 111 |
| End of boiling of degraded fluid, ° C.: | 381 | 472 | 550 | 389 | 376 |
| Gaseous decomposition products, %: | 0.15 | 0.17 | 0.24 | * | 0.29 |
| Low boiling components, %: | 5.52 | 7.91 | 10.02 | 3.14 | 3.38 |
| High boiling components, %: | 0.0 | 0.0 | 1.44 | 3.51 | 0.0 |
| Nonvolatile decomposition products, %: | 0.04 | 1.29 | 2.77 | 2.72 | 0.03 |
| Total degree of decomposition, %: | 5.7 | 9.4 | 14.2 | 9.4 | 3.4 |

*not measured
Fluid A: 1,2,3,4-tetrahydro(1-phenylethyl)naphthalene
Fluid B: partially hydrogenated terphenyl
Fluid C: dibenzyltoluene
Fluid D: diisopropylbiphenyl fluid
Fluid F: a 50/50 blend of 1,2,3,4-tetrahydro(1-phenylethyl)naphthalene and diisopropylbiphenyl Consideration of data in the last four rows of Table 13 shows the superior and surprising decompositional properties of the ST-THN and alkyl biphenyl blend.

It should be realized that the invention is not limited to the exact formulations or methods illustrated above, but that various changes and modifications may be made without departing from the spirit and scope of the invention as described within the following claims.

I claim:

1. A heat transfer fluid comprising:
   a) 1,2,3,4-tetrahydro(1-phenylethyl)naphthalene; and
   b) diisopropylbiphenyl.

2. The heat transfer fluid of claim 1 wherein 1,2,3,4-tetrahydro(1-phenylethyl)-naphthalene comprises at least 10 percent by weight of the heat transfer fluid.

3. The heat transfer fluid of claim 2 wherein 1,2,3,4-tetrahydro(1-phenylethyl)-naphthalene comprises at least 25 percent by weight of the heat transfer fluid.

4. A method for preparing a heat transfer fluid, the method comprising admixing 1,2,3,4-tetrahydro(1-phenylethyl)naphthalene with diisopropylbiphenyl.

5. The method of claim 4 wherein 1,2,3,4-tetrahydro(1-phenylethyl)naphthalene comprises at least 10 percent by weight of the heat transfer fluid.

6. The method of claim 5 wherein 1,2,3,4-tetrahydro(1-phenylethyl)naphthalene comprises at least 25 percent by weight of the heat transfer fluid.

7. A method of controlling the temperature in a manufacturing facility, the method comprising:
   using a heat transfer fluid in said manufacturing facility, said heat transfer fluid containing
   a) 1,2,3,4-tetrahydro(1-phenylethyl)naphthalene; and
   b) diisopropylbiphenyl.

8. The method of claim 7 wherein 1,2,3,4-tetrahydro(1-phenylethyl)naphthalene comprises at least 10 percent by weight of the heat transfer fluid.

9. The method of claim 8 wherein 1,2,3,4-tetrahydro(1-phenylethyl)naphthalene comprises at least 25 percent by weight of the heat transfer fluid.

* * * * *